United States Patent
Matherson et al.

(10) Patent No.: US 8,976,240 B2
(45) Date of Patent: Mar. 10, 2015

(54) SPATIALLY-VARYING SPECTRAL RESPONSE CALIBRATION DATA

(75) Inventors: Kevin Matherson, Windsor, CO (US); Yu-Wei Wang, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 701 days.

(21) Appl. No.: 13/263,254

(22) PCT Filed: Apr. 22, 2009

(86) PCT No.: PCT/US2009/041365
§ 371 (c)(1),
(2), (4) Date: Oct. 6, 2011

(87) PCT Pub. No.: WO2010/123499
PCT Pub. Date: Oct. 28, 2010

(65) Prior Publication Data
US 2012/0133765 A1    May 31, 2012

(51) Int. Cl.
*H04N 7/18* (2006.01)
*H04N 17/00* (2006.01)
*H04N 9/04* (2006.01)

(52) U.S. Cl.
CPC ............ *H04N 17/002* (2013.01); *H04N 9/045* (2013.01)
USPC ........... 348/135; 348/132; 348/133; 348/134; 348/136; 348/137; 348/138

(58) Field of Classification Search
CPC ....... H04N 17/002; H04N 9/045; H04N 7/18; H04N 7/181; G01B 11/022; G01B 11/024; G01C 15/00
USPC ........................................ 348/135
See application file for complete search history.

(56) References Cited

U.S. PATENT DOCUMENTS 6,157,735 A * 12/2000 Holub ............................ 382/167
6,161,902 A * 12/2000 Lieberman ............... 297/452.41
(Continued)

FOREIGN PATENT DOCUMENTS

CN       101305620 A     11/2008
EP         2166342 A1 *   3/2010  ............. G02B 21/00
(Continued)

OTHER PUBLICATIONS

Shaw et al, Spectral Imaging for Remote Sensing, 2003.*
(Continued)

*Primary Examiner* — Andy Rao
*Assistant Examiner* — Shan Elahi
(74) *Attorney, Agent, or Firm* — Kraguljac & Kalnay LLC (57) ABSTRACT

Systems, methods, and other embodiments associated with producing spatially varying spectral response calibration data are described. One example method includes controlling a digital camera to capture characteristic data arrays from light sensors in the digital camera in response to the digital camera being exposed to light stimuli from a multi-spectral reference display. The data arrays will be acquired multiple times at multiple locations in multiple stimuli provided from the multi-spectral reference display. The method also includes controlling a calibration logic to manipulate characteristic data arrays to produce spatially varying spectral response calibration data as a function of using characteristic data arrays and known wavelengths of the light in light stimuli. The method may also include providing the spatially varying spectral response calibration data to a downstream consumer (e.g., correction process, quality control process), displaying the data, or storing the data.

15 Claims, 6 Drawing Sheets

(56) References Cited

U.S. PATENT DOCUMENTS

| | | | |
|---|---|---|---|
| 7,471,831 B2 * | 12/2008 | Bearman et al. | 382/191 |
| 7,554,067 B2 * | 6/2009 | Zarnowski et al. | 250/208.1 |
| 7,567,349 B2 * | 7/2009 | Tearney et al. | 356/479 |
| 8,044,969 B2 * | 10/2011 | Osorio et al. | 345/604 |
| 8,101,903 B2 * | 1/2012 | Mokhnatyuk | 250/226 |
| 2002/0015536 A1 * | 2/2002 | Warren et al. | 382/284 |
| 2002/0101546 A1 * | 8/2002 | Sharp et al. | 348/760 |
| 2003/0234864 A1 * | 12/2003 | Matherson et al. | 348/175 |
| 2003/0234879 A1 * | 12/2003 | Whitman et al. | 348/242 |
| 2004/0207731 A1 * | 10/2004 | Bearman et al. | 348/207.99 |
| 2005/0084175 A1 * | 4/2005 | Olszak | 382/284 |
| 2005/0270402 A1 | 12/2005 | Nikkanen et al. | |
| 2006/0017922 A1 | 1/2006 | Lewis et al. | |
| 2006/0054782 A1 * | 3/2006 | Olsen et al. | 250/208.1 |
| 2006/0054787 A1 * | 3/2006 | Olsen et al. | 250/208.1 |
| 2006/0227333 A1 * | 10/2006 | Tearney et al. | 356/512 |
| 2006/0280360 A1 * | 12/2006 | Holub | 382/162 |
| 2006/0289760 A1 * | 12/2006 | Bathiche | 250/332 |
| 2007/0040100 A1 * | 2/2007 | Zarnowski et al. | 250/208.1 |
| 2007/0076101 A1 | 4/2007 | Baer | |
| 2007/0177029 A1 * | 8/2007 | Wada et al. | 348/222.1 |
| 2008/0029714 A1 * | 2/2008 | Olsen et al. | 250/475.2 |
| 2008/0095467 A1 * | 4/2008 | Olszak et al. | 382/284 |
| 2008/0129752 A1 * | 6/2008 | Riley et al. | 345/629 |
| 2008/0173793 A1 * | 7/2008 | Mokhnatyuk | 250/208.1 |
| 2008/0259186 A1 | 10/2008 | Wang et al. | |
| 2009/0051772 A1 * | 2/2009 | Rhoads | 348/187 |
| 2009/0152664 A1 * | 6/2009 | Klem et al. | 257/440 |
| 2009/0295963 A1 * | 12/2009 | Bamford et al. | 348/302 |
| 2009/0302409 A1 * | 12/2009 | Qian et al. | 257/437 |
| 2010/0013979 A1 * | 1/2010 | Golub et al. | 348/340 |
| 2011/0241145 A1 * | 10/2011 | Lenchenkov | 257/432 |

FOREIGN PATENT DOCUMENTS

| | | | | |
|---|---|---|---|---|
| JP | 2004-023792 A | | 1/2004 | |
| KR | 1020090021622 | | 3/2009 | |
| WO | 2007042853 A1 | | 4/2007 | |
| WO | WO 2007042853 A1 | * | 4/2007 | H04N 5/217 |
| WO | WO 2008012812 A2 | * | 1/2008 | G01J 3/28 |

OTHER PUBLICATIONS

Multisectral Imagery, Chapter 12, Multipectral Imagery, 2002.*
Office Action/Search Report, Application No. CN 200980158867.7, Date: Sep. 4, 2013, pp. 1-7 (English Translation of Search Report: pp. 1-2).
International Search Report and Written Opinion for related PCT Application No. PCT/US2009/041365, dated Dec. 23, 2009, 10 pages.
EP Search Report from Application Serial No. 09843769.2/2422524, PCT/US2009/041365, dated Apr. 9, 2014, 6 pages.

* cited by examiner

SPATIALLY-VARYING SPECTRAL RESPONSE CALIBRATION DATA

BACKGROUND

Cameras take pictures by receiving light. Cameras display pictures by reproducing, as faithfully as possible, the received light. Digital cameras, being electronic devices, may not produce a completely accurate reproduction due to issues associated with either capturing or displaying light. Issues associated with capturing light may be caused, at least in part by interactions between micro-lenses and charge coupled devices (CCDs). Other electronic imaging sensors can experience similar interactions. While micro-lenses may increase quantum efficiency and allow small pixel geometries, micro-lenses may also lead to color crosstalk issues and may increase the need for camera lens telecentricity. In many examples, lenses do not match the resolution of small-pixel sensors, experience manufacturing variability, and so on. The requirement of small F/# lenses with small-pixel sensors can result in decreased microlens efficiency as well as lead to color shading.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Before considering embodiments of the invention in greater detail, first consider the following. The human eye has a number of rods and cones that capture light. Similarly, a digital camera has a number of sensors, each of which may sense color and intensity at a number of pixels. The human eye also has a lens to focus light onto the rods and cones. Similarly, a digital camera may have a number of lenses that focus light onto sensors. One of the tasks of a digital camera is to convert analog signals (e.g., light of differing wavelengths) to digital information. The digital information can be used to control a display that will in turn produce light of differing wavelengths. The physical image sensors currently on the market are either charge coupled devices (CCDs) or complementary metal oxide semiconductors (CMOS). The photosensitive material of both devices is silicon, a semiconductor that can efficiently convert photon energy into electrical current. The signal created is a function of wavelength.

Pixels of a CMOS/CCD sensor capture electrons proportional to the exposure at the focal plane. Exposure H is defined as $H=E*t$, where E is the sensor plane illuminance in lux, and t is the time in seconds. The imaging properties of a CCD/CMOS sensor depend on a number of parameters, including but not limited to, number of pixels, pixel area, pixel well capacity, noise, microlenses, color filters, and color filter arrangement. Different digital signals can be made by different sensors. However, there may be variations between how the sensors in a camera turn light into electricity during the conversion. The variations may occur because some sensors contain defects or due to other phenomenon. Defects may cause a pixel to be lighter (hot) or darker (cold) than a neighboring pixel due, for example, to the linearity of a pixel, a low or high response for an incident amount of light, and so on. Thus, the camera may exhibit significant changes in the spectral sensitivity profile of individual pixels due to defects or sensor manufacturing variations. Additionally, consider that sensor response may vary as a function of wavelength. In the case of imaging an object at spatial position x, the spectral irradiance falling on the sensor is proportional to the product of the spectral reflectance of the object $O(\lambda)$ and the illuminant spectral power distribution $E(\lambda)$, where $\lambda$ is the wavelength. This results in a color signal $C(x,\lambda)$ out of the sensor. All of these issues can affect the quality of the spectral signal out of the sensor. Additional issues may arise due to spectral and optical crosstalk. Spectral crosstalk occurs due to imperfect color filters passing through some amount of unwanted light of other colors. Optical crosstalk occurs because the color filters are located some distance from the sensitive area of the pixel due to metal and insulation layers. Light coming through the filter at angles other than normal passes through a filter and can be partially absorbed by the adjacent pixel rather than the intended pixel. Depending on the F/# of the lens, this portion of the light absorbed by neighboring pixels can be quite large. The fact that the lens angle varies spatially from center to corner of the image contributes to a spatially varying spectral response.

In optics, vignetting is a reduction of image brightness at the corner relative to the center. In some examples, lens and sensor combinations may produce images that are darker in the corner than in the center. This vignetting may vary with sensor type as a function of micro-lens and pixel design. Therefore, it may be desirable to individually calibrate cameras to account for the vignetting that results from the combination of lens and sensors and variations associated with manufacturing the lenses and/or sensors.

There are several causes of vignetting: natural vignetting, mechanical vignetting, lens vignetting, and sensor or pixel vignetting. Natural vignetting can be approximated by the $\cos^n \theta$ law, where n is an integer, and the illuminance falling on a surface varies according to the cosine of the angle of the light impinging on a sensor array. Such vignetting generally affects intensity falloff. Mechanical vignetting occurs when off-axis light beams are blocked by baffles, filter stacks, and lens elements. Mechanical vignetting affects intensity falloff. Lens vignetting may increase as focal length decreases and may affect intensity falloff. Sensor vignetting is caused by the angular dependence of sensors used for digital imaging systems. Light incident on the sensor normal to the sensor produces a stronger signal than light incident on the sensor at an oblique angle. Sensor vignetting may also increase as focal length decreases and may affect color and intensity. As digital cameras continue to shrink in size, focal length may continue to decrease and thus vignetting may become even more pronounced. The product of optical vignetting and pixel vignetting lead to the overall vignetting of the sensor.

Vignetting may be caused by non-telecentric lenses that lead to light collected by a sensor varying as a function of pixel sensitivity off axis relative to center. Whatever the cause of vignetting, it may be desirable to correct for the vignetting. Correcting for vignetting of different color planes depends on first calculating the intensity distribution of each color plane. Conventionally, an attempt may have been made to calibrate a camera to facilitate correcting for the color-dependent vignetting. Calibrating a camera may include estimating responsivity functions for camera sensors. Conventional calibration attempts may have included, for example, capturing an image of a spatially uniform white or other spatially uniform source of a constant color temperature. From this image, ratios of color channels may have been produced. The ratios of color channels may then have been used in linear interpolation that proceeded from the center of an image to its corners. This approach may have been unsatisfactory because it may have been limited to producing calibration data that facilitates correcting color-dependent vignetting that may be modeled as gain-dependent color vignetting. This limitation may have produced unsatisfactory results in camera modules that exhibit significant changes in the spectral sensitivity profile of individual pixels that may lead to color-dependent vignetting caused by a spatially varying spectral response.

Example systems and methods produce spatially-varying spectral response calibration data to facilitate removing spatially-varying color-dependent vignetting for a digital imaging device. The color vignetting may be a result of a spatially-varying change in the spectral response of individual pixels. The device to be calibrated is placed where it can receive stimulus from a multi-spectral reference surface. The stimulus may be, for example, a presentation of light of a certain color. The light emitting properties of the multi-spectral reference surface are well known with great precision and thus the wavelength of light in a presentation can be known with great precision (e.g., within 1 nm). While a precise narrow-band source is described, in some embodiments, a broad spectral response (e.g., 10-20 nm width) may be available. The multi-spectral reference surface may be, for example, a multi-spectral, spatially-uniform, self-illuminating device that can present different colors, different combinations of colors, and so on. The digital imaging device may acquire information from the multi-spectral reference surface and/or may control the multi-spectral reference surface to produce desired light colors, patterns, and so on.

The device to be calibrated images the multi-spectral reference surface a number of times at a number of locations under a number of different conditions. The images may be, for example, flat-field images or characteristic data arrays at different, known wavelengths that can be produced by the reference surface. Imaging the multi-spectral reference surface a number of times facilitates capturing arrays of data of the multi-spectral reference surface. Thus, instead of a conventional approach that takes a single image of a single location of a spatially uniform (e.g., white) reference, example systems and methods acquire multiple images at multiple locations of a multi-spectral reference surface under different conditions (e.g., colors). Example systems and methods may use imager responsivity functions to map the spectral power distributions of incident light sensors to a sensor response.

In one example, the data acquired from the multiple images at the multiple locations at the multiple wavelengths of the multi-spectral surface are transformed into sparse matrices that may be manipulated, for example, into color correction matrices for different spatial locations. More generally, the data acquired from the multiple images at the multiple locations at the multiple wavelengths is processed to determine the camera spectral response at the sampled points. The camera spectral response can be determined by using the acquired signal from the signal known to have been produced by the multi-spectral reference surface. In some examples, determining the spectral response may include identifying a blue response, a green response, and a red response. While three colors are mentioned, one skilled in the art will appreciate that a greater and/or lesser number of responses may be identified.

Conventionally, it may have been assumed that a spectral response varied linearly from a known response at a first position to an unknown response at a second position. Thus, a conventional system may have determined a spectral response at a single location (e.g., image center) and then performed a linear transform to produce an assumed spectral response at other locations (e.g., corners). However, as digital cameras have advanced, this assumption concerning a linearly scalable spectral response has been shown to be faulty. Therefore, example systems and methods do not engage in the conventional approach of acquiring a single image and computing a single spectral response at a single location in that image. Instead, example systems and methods sample at a number of points under a number of conditions (e.g., different wavelengths) and compute calibration data for the multiple sample points. Furthermore, multiple images taken under multiple conditions may be acquired.

To summarize, example systems and methods produce spatially-varying spectral response calibration data for an imaging device. Example systems and methods may be configurable with respect to a number of sample points to be sampled, with respect to the size of a location to be sampled, with respect to the shape of a location to be sampled, and so on. Example systems and methods may also be configurable with respect to the number of images to be taken of a multi-spectral reference surface, with respect to the distribution of patterns and the mix of patterns for locations to be sampled, and so on. For example, the multi-spectral reference surface may be capable of producing highly precise light at wavelengths from 380 nm to 780 nm. Therefore, example systems and methods may control the multi-spectral reference surface to present light having N different wavelengths at different times. The example systems and methods may acquire images for each of the different wavelengths produced.

With information about what light was produced and with the multiple samples from multiple locations under multiple conditions available, a spectral response can be computed for the different locations. The spectral response may then be provided to a downstream consumer (e.g., correction logic), may be stored in a tangible medium (e.g., computer memory, compact disc), may be used to control a process (e.g., correction process, quality control process), and so on. For example, a first camera may produce a first set of spectral responses that fall within a tolerance and for which a correction can be provided. The spectral response data associated with this first camera may be used to control a correction process. However, a second camera may produce a second set of spectral responses that fall outside a tolerance and for which a correction may not be computable. In this case the spectral response data may be used to control a quality control process to reject the camera. One skilled in the art will appreciate that the spectral response data may be used for other purposes.

One example method includes controlling an imaging device to capture a set of characteristic data arrays in response to being exposed to light from a multi-spectral reference source. The example method includes manipulating the characteristic data arrays to produce calibration information. The calibration information may then be stored, provided to a calibration information consumer, used to control a process, and so on. In one example, the method also includes controlling the multi-spectral reference source to produce a set of light presentations, where members of the set of light presentations have different wavelengths. The method may therefore include acquiring data from the multi-spectral reference to facilitate using sensed signals to actually provided signals.

In one example, the imaging device may be controlled to capture a set of characteristic data arrays for different members of a set of light presentations. For example, the multi-spectral reference source may produce a red light, a green light, a blue light, and so on. A set of characteristic data arrays may be acquired for each of the different colored lights. While three colors of light are described, one skilled in the art will appreciate that a greater and/or lesser number of light colors may be employed.

Image formation can be characterized by mathematical equations. One example image formation equation is:

$$S = R^T L$$

where S is a matrix where the $S_{i,j}$ element is the response of the $i^{th}$ color sensor due to the $j^{th}$ incident light signal, and where an element $S_{i,j}$ is a single color from the Bayer filter array, where R is a matrix where the $i^{th}$ column contains the responsivity function of the $i^{th}$ color sensor, and where L is a matrix where the $j^{th}$ column contains the spectral power distribution of the $j^{th}$ incident light signal. When data is windowed, then $S_{i,j}$ becomes a vector, the size of which depends on the number of different color elements in the sensor.

Sensor calibration is the calculation of the sensor responsivity functions (R) from sensor responses (S) that arise from capturing a set of known incident light signals (L). The known incident light signals (L) may be provided, for example, by the multi-spectral reference source. In one example, calibration involves inverting a matrix to solve for R when L is known and S is measured. In one example, inverting the matrix is described according to:

$$SL^{-1} = R^T.$$

One skilled in the art will appreciate that this does not guarantee that L is invertible.

A multi-spectral reference surface can produce light of known wavelengths. A camera can take pictures of the light of known wavelengths. When a light of a known wavelength is produced, the camera is supposed to sense exactly that wavelength. But it might not. It might sense something else. However, if the properties of the multi-spectral reference surface are well known and available to the camera or a calibration logic, then it is possible for the camera or calibration logic to compute calibration data as described above. If the properties of the multi-spectral reference surface are known and available to a calibration logic, and if the sensed signals are available to the calibration logic, then the calibration logic can compute calibration data as described above. One skilled in the art will appreciate that the calibration logic may be located in the camera or external to the camera. In one example, the calibration logic may receive spectral response data from a camera, compute spatially-varying spectral response calibration data, and provide the spatially-varying spectral response calibration data to the camera, to a correction logic, to a quality control logic, and so on. Having the calibration logic external to the camera may reduce space, weight, and power characteristics of the camera. If the calibration logic is web-based, then as new calibration techniques become available, a vintage digital camera may be able to communicate spectral response data to the external calibration logic and benefit from the advances without requiring software, firmware, or hardware updating. This may extend the functional life of a camera.

A camera can acquire data for many pixels. It may be difficult or computationally intensive to produce calibration data for each pixel. Therefore it might be valuable to produce some calibration data for a subset of pixels and then to mathematically predict calibration data for other pixels. Therefore, instead of just taking a sample at the center of the image, example systems and methods may take samples at different locations and determine calibration data for the different sample locations. Additionally, calibration data can be produced for a group of sensors or pixels. Furthermore, instead of just taking a picture of one color light (e.g., white), example systems and methods may take many flat field pictures for each sample location. The calibration data can then be computed based on the different colors at the different locations. Other systems and methods may then take additional steps (e.g., interpolation, correction) based on the calibration data.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

CD: compact disk.

DVD: digital versatile disk and/or digital video disk.

"Computer-readable medium", as used herein, refers to a medium that stores signals, instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Data store", as used herein, refers to a physical and/or logical entity that can store data. A data store may be, for example, a database, a table, a file, a list, a queue, a heap, a memory, a register, and so on. In different examples, a data store may reside in one logical and/or physical entity and/or may be distributed between two or more logical and/or physical entities.

"Logic", as used herein, includes but is not limited to hardware, firmware, software in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

"Software", as used herein, includes but is not limited to, one or more executable instruction that cause a computer, processor, or other electronic device to perform functions, actions and/or behave in a desired manner. "Software" does not refer to stored instructions being claimed as stored instructions per se (e.g., a program listing). The instructions may be embodied in various forms including routines, algorithms, modules, methods, threads, and/or programs including separate applications or code from dynamically linked libraries.

"User", as used herein, includes but is not limited to one or more persons, software, computers or other devices, or combinations of these.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on. The physical manipulations create a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, determining, and so on, refer to actions and processes of a computer system, logic, processor, or similar electronic device that manipulates and transforms data represented as physical (electronic) quantities.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 1:
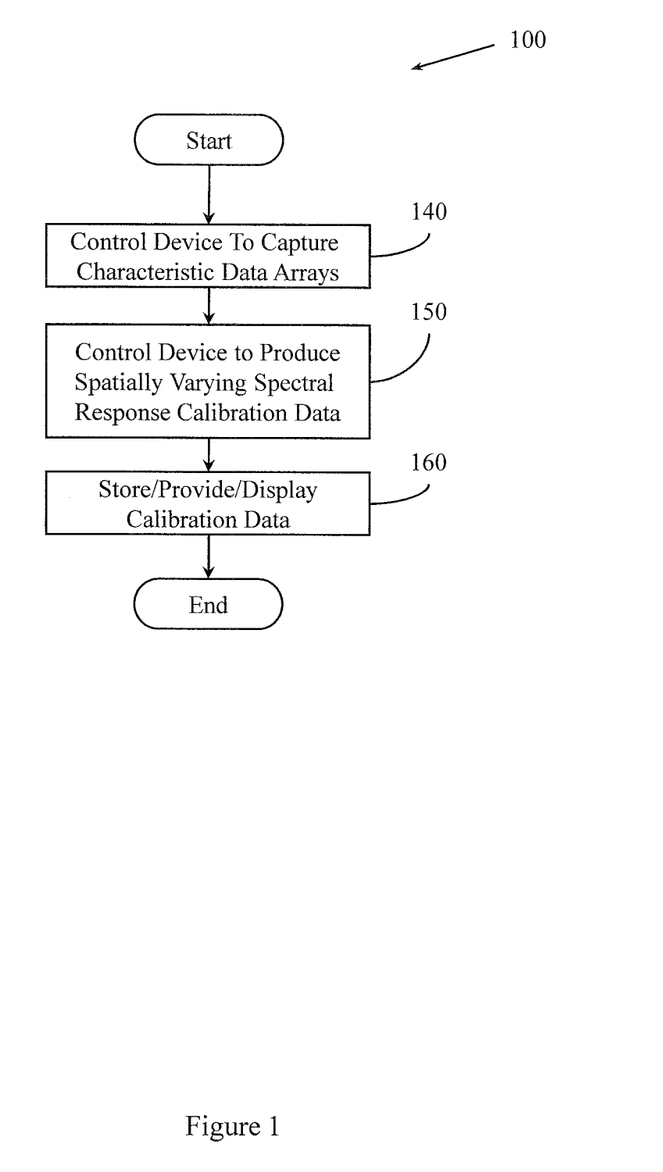
FIG. 1 illustrates an example method associated with producing spatially-varying spectral response calibration data.

FIG. 1 illustrates a method 100 associated with producing spatially-varying spectral response calibration data. Method 100 may include, at 140, controlling a digital camera to capture two or more characteristic data arrays from light sensors in the digital camera. The two or more characteristic data arrays may be captured in response to the digital camera being exposed to two or more light stimuli provided by a multi-spectral reference display. The wavelengths of the light in the two or more light stimuli are known. In one example, a characteristic data array comprises data from at least two sample positions in a light stimulus. In one example, a light stimulus comprises a multi-spectral light presentation comprising light of two or more different colors. Thus, method 100 may include parsing a characteristic data array into two or more color planes. In one example, a characteristic data array may be parsed into four color planes. In one example, a characteristic data array is parsed into as many color planes as there are colors present in the light stimulus.

Method 100 may also include, at 150, controlling a calibration logic to manipulate characteristic data arrays to produce spatially varying spectral response calibration data. The spatially varying spectral response data will be computed as a function of characteristic data arrays and known wavelengths of the light in light stimuli. In one example, manipulating characteristic data arrays to produce spatially varying spectral response calibration data may include calculating sensor responsivity functions (R) from sensor responses (S) that arise from capturing a set of known incident light signals (L) associated with a light stimulus. In one example, producing spatially varying spectral response calibration data comprises inverting a matrix to solve for R given L and S. In one example, manipulating characteristic data arrays may include parsing images into separate color planes and then subdividing the separate color plane images into sparse arrays. Data from the sparse arrays can then be manipulated (e.g., averaged) to determine responsivity functions.

Method 100 may also include, at 160, performing one or more of, providing the spatially varying spectral response calibration data to a correction process, controlling a correction process based, at least in part, on the spatially varying spectral response calibration data, storing the spatially varying spectral response calibration data in a tangible medium, and displaying the spatially varying spectral response calibration data. Thus, the spatially varying spectral response data can be stored, provided, used to control another process, and so on.

While FIG. 1 illustrates various actions occurring in serial, it is to be appreciated that various actions illustrated in FIG. 1 could occur substantially in parallel. By way of illustration, a first process could capture images while a second process could read the light spectral properties simultaneously. While two processes are described, it is to be appreciated that a greater and/or lesser number of processes could be employed and that lightweight processes, regular processes, threads, and other approaches could be employed.

In one example, a method may be implemented as computer executable instructions. Thus, in one example, a computer-readable medium may store computer executable instructions that if executed by a machine (e.g., processor) cause the machine to perform method 100. While executable instructions associated with the method 100 are described as being stored on a computer-readable medium, it is to be appreciated that executable instructions associated with other example methods described herein may also be stored on a computer-readable medium.

Figure 2:
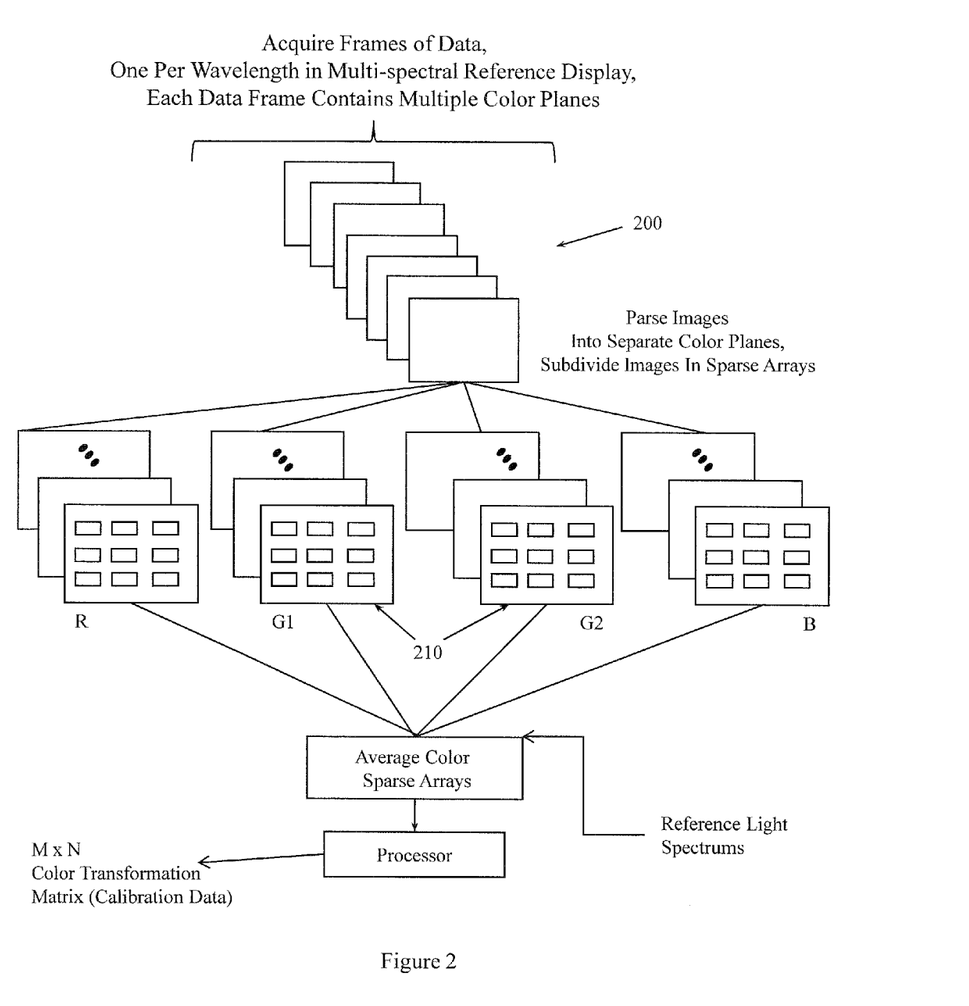
FIG. 2 illustrates example sets of data acquired by a method associated with producing spatially-varying spectral response calibration data.

FIG. 2 illustrates example sets of data acquired by a method associated with producing spatially-varying spectral response calibration data. FIG. 2 illustrates frames 200 of data being acquired. In one example, one frame may be acquired for each wavelength present in a multi-spectral reference display presentation. A data frame may contain multiple color planes because a sensor has multiple colors. For a multi-spectral reference display, there may be N sensor color planes times the number (X) of colors in the multi-spectral reference display, yielding a total of N*X color planes. Thus, FIG. 2 also illustrates how the data frames may be parsed into separate color planes 210. In one example, there may be one color plane for each color plane in the display presentation. FIG. 2 also illustrates how the separate color planes can be subdivided into sparse arrays. This may facilitate averaging color planes for the sparse arrays.

Figure 3:
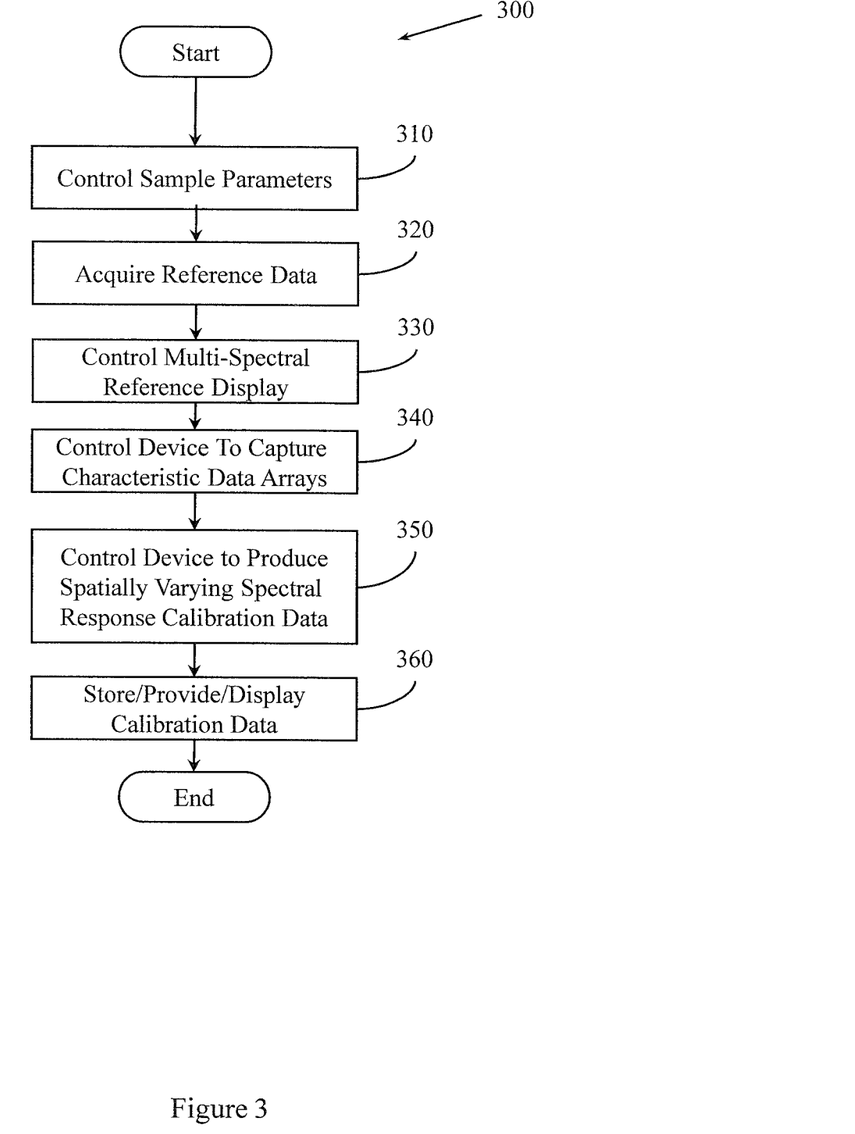
FIG. 3 illustrates another example method associated with producing spatially-varying spectral response calibration data.

FIG. 3 illustrates a method 300 associated with producing spatially-varying spectral response calibration data. Method 300 includes some actions similar to those described in connection with method 100 (FIG. 1). For example, method 300 includes, at 340, controlling the camera to acquire characteristic data arrays. While a camera is described, one skilled in the art will appreciate that other devices may acquire characteristic data arrays. Method 300 also includes, at 350, controlling the camera to manipulate the characteristic data arrays to produce spatially varying spectral response calibration data. Method 300 also includes, at 360, storing/providing/displaying the data. However, method 300 includes other actions.

For example, method 300 also includes, at 310, controlling one or more sample parameters. The sample parameters may include, for example, the number of sample positions to be sampled in a light stimulus, the locations of sample positions to be sampled in a light stimulus, the shapes of the sample positions to be sampled in the light stimulus, and so on.

Method 300 may also include, at 320, acquiring reference data from the multi-spectral reference display. The reference data may include, for example, spectral data associated with light stimuli presented by the multi-spectral reference display. This spectral data may describe, for example, the wavelength of light associated with a test image produced by the multi-spectral reference display.

Method 300 may also include, at 330, controlling the multi-spectral reference display to display a desired light stimulus. For example, a first camera may have a first set of color pixels that includes a certain number and type of color pixels. Testing this first camera may include presenting eight images with eight different colors. A second camera may have a second set of color pixels that includes a different number and/or type of color pixels. Testing this second camera may include presenting sixteen images with sixteen different colors. Thus, different cameras may be able to control the multi-spectral reference display to display a number and type of images that optimize producing spatially varying spectral response calibration data. While a discrete number of colors are described, one skilled in the art will appreciate that more generally a reference light source may be configured to cover a desired portion of the visible spectrum. In one example, the desired portion may be the entire visible spectrum.

Figure 4:
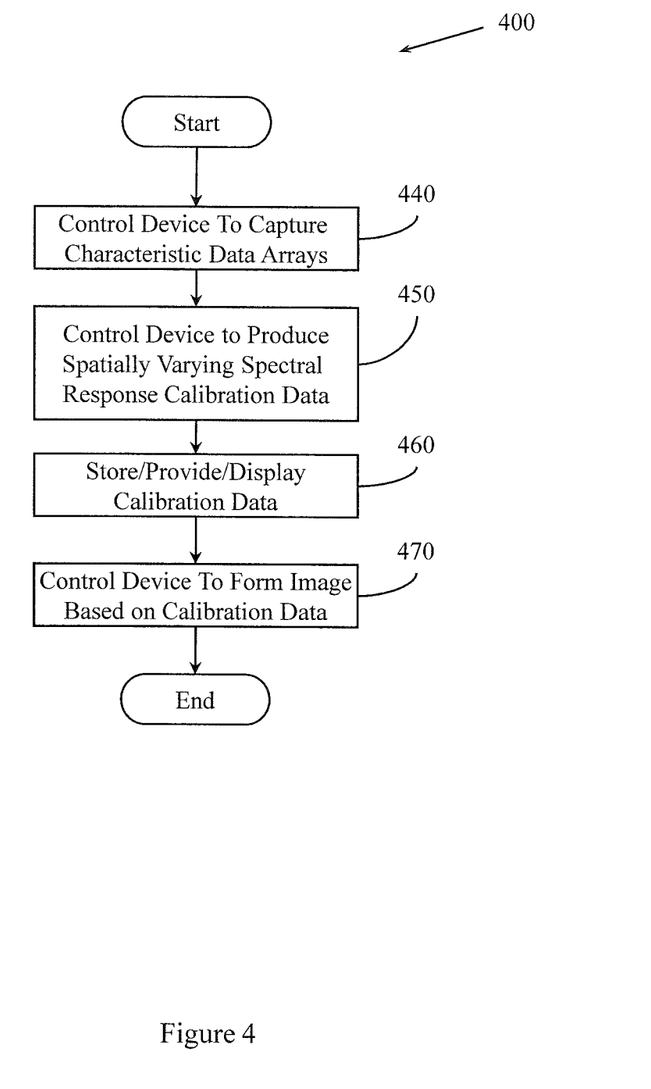
FIG. 4 illustrates another example method associated with producing spatially-varying spectral response calibration data.

FIG. 4 illustrates a method 400 associated with producing spatially-varying spectral response calibration data. Method 400 includes some actions similar to those described in connection with method 100 (FIG. 1). For example, method 400 includes, at 440, controlling the camera to acquire characteristic data arrays. While a camera is described in connection with method 400, one skilled in the art will appreciate that other devices (e.g., computers, processors,) may be controlled to acquire characteristic data arrays. Method 400 also includes, at 450, controlling the camera to manipulate the characteristic data arrays to produce spatially varying spectral response calibration data. Method 400 also includes, at 460, storing/providing/displaying the data. However, method 400 includes other actions.

For example, method 400 may also include, at 470 controlling the digital camera to perform image formation. Image formation may be characterized by:

$$S=R^T L$$

where S is a matrix where the $S_{i,j}$ element is the response of the $i^{th}$ color image sensor due to the $j^{th}$ incident light signal, where R is a matrix where the $i^{th}$ column contains the responsivity function of the color image sensor, and where L is a matrix where the $j^{th}$ column contains the spectral power distribution of the $j^{th}$ incident light signal.

Figure 5:
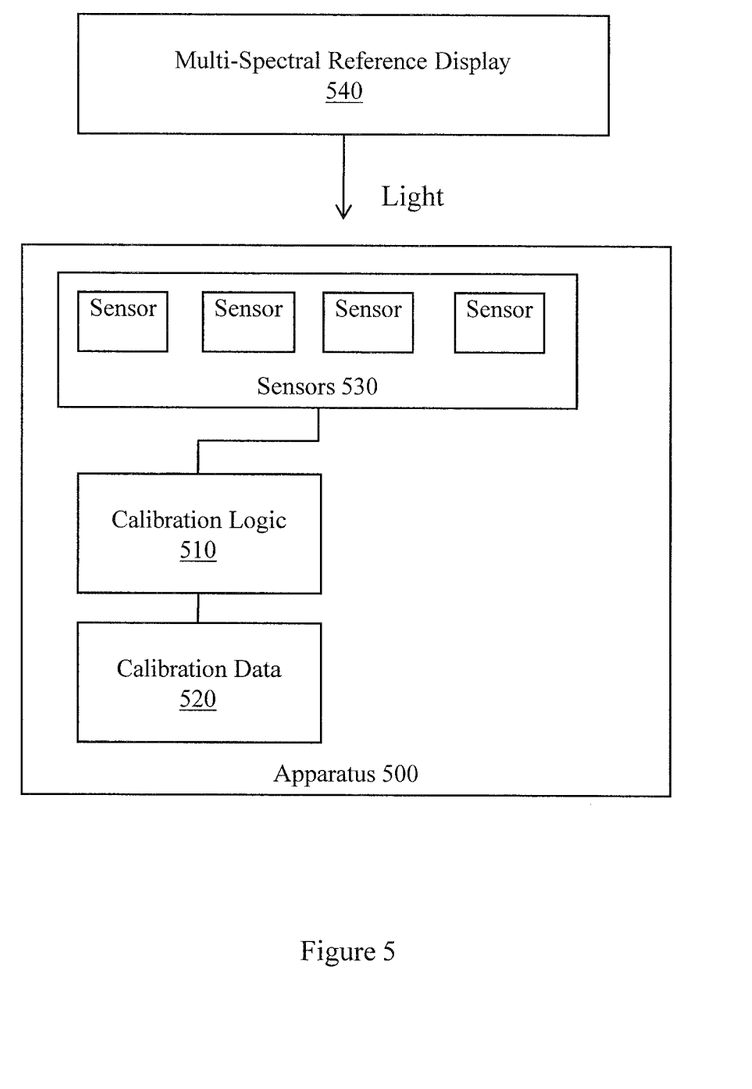
FIG. 5 illustrates an example apparatus associated with producing spatially-varying spectral response calibration data.

FIG. 5 illustrates an apparatus 500 associated with producing spatially-varying spectral response calibration data. Apparatus 500 includes a calibration logic 510 that is configured to produce a spatially varying spectral response calibration data 520 for a set 530 of sensors in a digital camera. The calibration data 520 will be produced as a function of processing a set of sensor responses (S) in the digital camera and a set of known incident light signals (L) associated with a set of test images provided by a multi-spectral reference display 540. In one example, the set of sensor responses comprise signals from two or more locations in a test image that is produced by the multi-spectral reference display 540. In one example, the set of test images comprise at least two multi-spectral presentations.

In one example, the calibration logic 510 is configured to calculate a sensor responsivity function for a sensor. In one example, the calibration logic 510 is configured to solve for R when L is known and when S has been acquired. Solving for R may include performing a matrix inversion. One sample matrix inversion is described above.

Figure 6:
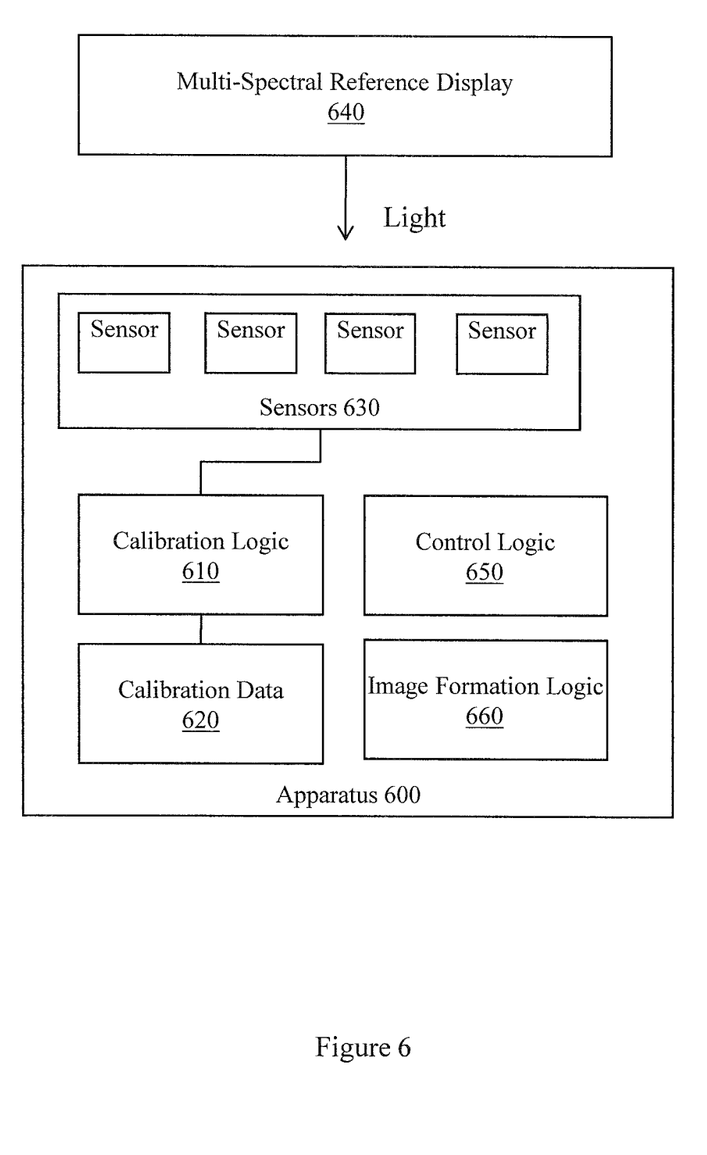
FIG. 6 illustrates another example apparatus associated with producing spatially-varying spectral response calibration data.

FIG. 6 illustrates an apparatus 600 associated with producing spatially-varying spectral response calibration data. Apparatus 600 includes some elements similar to those described in connection with apparatus 500 (FIG. 5). For example, apparatus 600 includes a calibration logic 610 that produces calibration data 620 for a set 630 of sensors. Apparatus 600 may receive light from a multi-spectral reference display 640. However, apparatus 600 may include additional elements.

For example, apparatus 600 may include an image formation logic 660. Image formation logic 660 may be configured to form an image according to:

$$S=R^T L$$

where S is a matrix where the $S_{i,j}$ element is the response of the $i^{th}$ color image sensor due to the $j^{th}$ incident light signal, where R is a matrix where the $i^{th}$ column contains the responsivity function of the $i^{th}$ color image sensor, and where L is a matrix where the $j^{th}$ column contains the spectral power distribution of the $j^{th}$ incident light signal.

Apparatus 600 may also include a control logic 650. Control logic 650 may be configured to control the samples acquired from a test image provided by multi-spectral reference display 640. Control logic 650 may control, for example, the number of sample positions to be sampled in a test image, the locations of sample positions to be sampled in a test image, the shapes of the sample positions to be sampled in the test image and so on. Additionally and/or alternatively, control logic 650 may be configured to control the multi-spectral reference display 640. Controlling the multi-spectral reference display 640 may include controlling the multi-spectral reference display 640 to produce a particular test image, to configure the test image with respect to wavelengths of light in the test image, and so on. Apparatus 600 may also include an image formation logic 660 that is configured to produce an image.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A computer-implemented method, comprising:
controlling a digital device to capture two or more characteristic data arrays from light sensors in the digital device in response to the digital device being exposed to two or more light stimuli provided by a multi-spectral reference display, where the wavelengths of the light in the two or more light stimuli are known, and where a characteristic data array comprises an image produced by the digital device that includes data from at least two sample positions in a light stimulus;
controlling a calibration logic to calculate spatially varying spectral response calibration data, the calibration logic to manipulate characteristic data arrays to produce spatially varying spectral response calibration data as a function of a comparison between characteristic data arrays and known wavelengths of the light in light stimuli, wherein the spatially varying spectral response calibration data includes spectral response calibration data for each of the at least two sample positions; and
performing one or more of, providing the spatially varying spectral response calibration data to a correction process, controlling a correction process based, at least in part, on the spatially varying spectral response calibration data, storing the spatially varying spectral response calibration data in a storage device, and displaying the spatially varying spectral response calibration data.

2. The computer-implemented method of claim 1, the digital device being a digital camera, and where a light stimulus comprises a multi-spectral light presentation comprising light of M different colors, M being an integer greater than one.

3. The computer-implemented method of claim 2, comprising parsing a characteristic data array into N color planes, N being an integer greater than one.

4. The computer-implemented method of claim 3, N being four.

5. The computer-implemented method of claim 2, comprising:
controlling the multi-spectral reference display to display a desired light stimulus.

6. The computer-implemented method of claim 2, comprising:
acquiring reference data from the multi-spectral reference display, the reference data comprising spectral data associated with light stimuli presented by the multi-spectral reference display.

7. The computer-implemented method of claim 2, comprising:
controlling one or more of, the number of sample positions to be sampled in a light stimulus, the locations of sample positions to be sampled in a light stimulus, the number of pixels in a sample position, and the shapes of the sample positions to be sampled in the light stimulus.

8. The computer-implemented method of claim 2, comprising controlling the digital camera to perform image formation characterized by:

$$S=R^T L$$

where S is a matrix where the $S_{i,j}$ element is the response of the $i^{th}$ color image sensor due to the $j^{th}$ incident light signal,
where R is a matrix where the $i^{th}$ column contains the responsivity function of the $i^{th}$ color image sensor, and
where L is a matrix where the $j^{th}$ column contains the spectral power distribution of the $j^{th}$ incident light signal.

9. The computer-implemented method of claim 8, where manipulating characteristic data arrays to produce spatially varying spectral response calibration data as a function of a comparison between characteristic data arrays and known wavelengths of the light in light stimuli comprises:
calculating sensor responsivity functions (R) from sensor responses (S) that arise from capturing a set of known incident light signals (L) associated with a light stimulus.

10. The computer-implemented method of claim 9, where to produce spatially varying spectral response calibration data comprises inverting a matrix to solve for R given L and S.

11. A system, comprising:
a calibration logic to calculate spatially varying spectral response calibration data, the calibration logic to produce a spatially varying spectral response calibration data for a set of sensors in a digital camera as a function of processing a set of sensor responses (S) in the digital camera and a set of known incident light signals (L) associated with a set of test images provided by a multi-spectral reference display, where the set of sensor responses comprise signals from two or more locations in a test image, where the spatially varying spectral response calibration data includes spectral response calibration data for each of at least two sample positions, and where the set of test images comprises at least two multi-spectral presentations.

12. The system of claim 11, where the calibration logic includes logic to calculate a sensor responsivity function for a sensor.

13. The system of claim 12, including an image formation logic to form an image according to:

$$S = R^T L$$

where S is a matrix where the $S_{i,j}$ element is the response of the $i^{th}$ color image sensor due to the $j^{th}$ incident light signal, where R is a matrix where the $i^{th}$ column contains the responsivity function of the $i^{th}$ color image sensor, and where L is a matrix where the $j^{th}$ column contains the spectral power distribution of the $5^{th}$ incident light signal.

14. The system of claim 13, where the calibration logic includes logic to solve for R given L and S by performing a matrix inversion.

15. The system of claim 11, comprising a control logic to control one or more of, the number of sample positions to be sampled in a test image, the number of pixels in a sample location, the locations of sample positions to be sampled in a test image, controlling the shapes of the sample positions to be sampled in the test image, controlling the multi-spectral reference display to produce a test image, and controlling the multi-spectral reference display to configure the test image with respect to wavelengths of light in the test image.

* * * * *

UNITED STATES PATENT AND TRADEMARK OFFICE
CERTIFICATE OF CORRECTION

PATENT NO. : 8,976,240 B2
APPLICATION NO. : 13/263254
DATED : March 10, 2015
INVENTOR(S) : Kevin Matherson et al.

It is certified that error appears in the above-identified patent and that said Letters Patent is hereby corrected as shown below:

In the claims

In column 13, line 8, in Claim 13, delete "$5^{th}$" and insert -- $j^{th}$ --, therefor.

Signed and Sealed this
Fifteenth Day of December, 2015

Michelle K. Lee
*Director of the United States Patent and Trademark Office*